United States Patent [19]

Petrisko et al.

[11] 3,777,555
[45] Dec. 11, 1973

[54] CUMULATIVE FATIGUE LIFE INDICATOR

[75] Inventors: Edwin M. Petrisko, Annapolis, Md.; Karl H. Keller, deceased, late of Arnold, Md.; by Penny C. Keller, administratrix, Oceanside, Calif.

[73] Assignee: The United States of America as represented by the Secretary of the Navy, Washington, D.C.

[22] Filed: May 3, 1972

[21] Appl. No.: 249,835

[52] U.S. Cl. ................................................. 73/91
[51] Int. Cl. ........................................... G01n 3/32
[58] Field of Search ................. 73/91, 88.5 R, 71.2, 73/90

[56] References Cited
UNITED STATES PATENTS 3,295,364  1/1967  Van Dyke .................... 73/71.2 X
3,441,718  4/1969  Hatherell et al. ............... 73/91 X
3,628,377  12/1971  Weiss ............................ 73/91

Primary Examiner—Jerry W. Myracle
Attorney—R. S. Sciascia et al.

[57] ABSTRACT

The purpose of this invention is accumulation and display of information indicative of expended and remaining fatigue life of a test specimen or pressure vessel. Strain-gauge output signals are amplified by a dual channel conditioning circuit. The dual channel bipolar strain signals are then used to compute the alternating stress range absolute value on a continuous basis. Voltage signals proportional to the alternating stress are then presented to a counter which registers the individual accumulated stress cycles with reference to the total allowable cycles in thousandths of counts and provides a usage factor indicating cumulative fatigue damage and remaining fatigue life.

5 Claims, 2 Drawing Figures

CUMULATIVE FATIGUE LIFE INDICATOR

The invention described herein may be manufactured and used by or for the Government of the United States of America for Governmental purposes without the payment of any royalties thereon or therefor.

This invention relates to the measurable strain imposed upon a structure and the fatigue accumulated by the structure under the strain. The purpose of the invention is to accumulate and display information indicative of the expended and remaining fatigue life of a structure. In the past, structures such as pressure vessels, have been utilized without maintaining operational data indicative of the fatigue of the structure and its remaining life. Although stress cycle fatigue curves can be accurately determined making this type of monitoring feasible, there is no device in existence which is capable of accumulating this data in terms of a signal and storing and visually displaying this information so that the remaining useful life of the device can be quickly and accurately determined.

SUMMARY OF THE INVENTION

Strain data is obtained from standard strain-gauges mounted on a test specimen and producing cyclical bipolar ($E_1$ and $E_2$) signals indicative of maximum bipolar stress. The signals are amplified and combined according to a predetermined mathematical relationship to yield two new signals, called the alternating stress range, representing one-half the principle stress difference (designated $ES_1$, $ES_2$). The absolute value of one of these stress signals $ES_1$ or $ES_2$ will always be greater than the absolute value of the other, $ES_2$ or $ES_1$. The rectified signals, $ES_1$ and $ES_2$ are then placed in parallel and a signal output is derived representing the larger of the cyclical alternating stress values, $ES_1$ and $ES_2$.

The larger signal of $ES_1$ and $ES_2$ is inputted to a voltage divider network whose output is proportional to the absolute value of the alternating stress range. The voltage divider is tied into a relay tree, with each relay responsive to a one volt increment of input signal. The number of relays actuated will then be equal to the magnitude of the signal, (i.e., a 4 volt signal actuates relays 1, 2, 3, and 4) and the relay output will be a number of pulses equal to the voltage magnitude input. Pulses on the relays are routed to a rotary stepper which steps the rotary switch to a numbered position corresponding to the input signal magnitude. As the alternating stress signal amplitude decays, a second pulse is produced which is routed to the step rotary switch connecting the pulse to an appropriate counter. In this way, a count is registered at the appropriate stress level by a display counter for each alternating stress cycle.

A number of counters are provided equal to the maximum alternating stress voltage and equal to the number of pulse increments. Each counter registers the ratio $ni/NI$ where ni is equal to the number of expended cycles for operation at the particular stress level and NI is equal to the number of cycles to failure at the same level. The counters are calibrated to equal one one-thousandth of the total allowable cycles of allowable fatigue for the specimen at the respective stress level for each counter. In addition, an additional counter connected to the outputs of each of the counters corresponding to a respective input level accumulates the total number of counts.

Accordingly, it is one object of this invention to accumulate and display information indicative of expended and remaining fatigue life of a structure.

DESCRIPTION OF THE INVENTION

Figure 1:
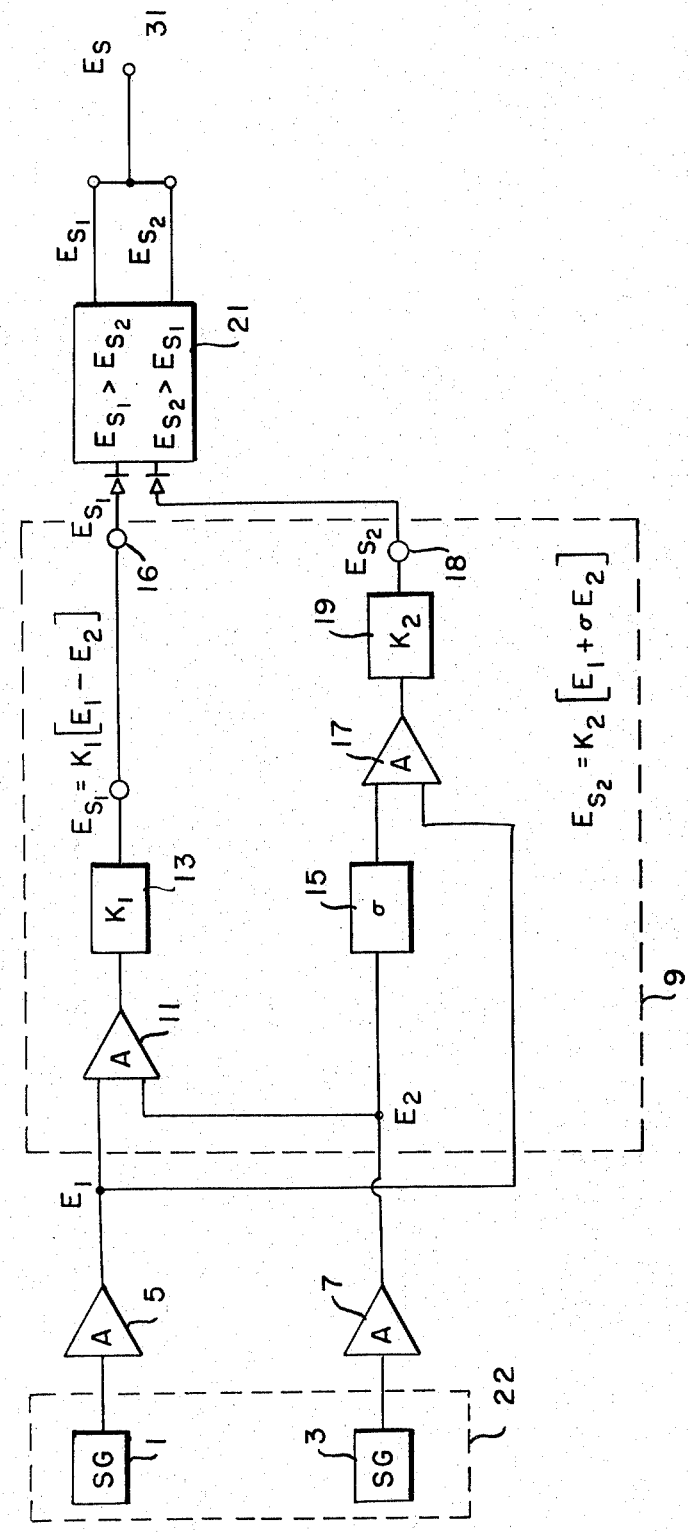
FIG. 1 shows in block diagram the system for developing signals proportional to strain and combining the signals to produce bipolar signals indicative of the alternating stress differences $ES_1$ and $ES_2$.

A dual channel strain-gauge signal amplification circuit is shown in FIG. 1 as having two bipolar strain-gauges 1 and 3 mounted on a structure 2. Each of the strain-gauge signals is amplified by bipolar amplifiers 5 and 7 which have bipolar outputs $E_1$ and $E_2$ respectively.

The portion of the system shown within dashed box 9 receives the bipolar strain signals $E_1$ and $E_2$ and produces a signal equal to the alternating stress range (one-half the difference of the principle stresses) on a continuous basis. The computations involved are:

$$ES_1 = K_1 [E_1 - E_2]$$
$$ES_2 = K_2 [E_1 + \sigma E_2]$$

where $K_1$ is the modulus of elasticity, divided by two times the quantity 1 plus Poisson's ratio, and $K_2$ is the modulus of elasticity divided by two times the quantity 1 minus the square of Poisson's ratio.

$E_1$ is the algebraic value of the strain in a direction of maximum stress on the surface of the structure.

$E_2$ is the algebraic value of the strain in the direction of minimum stress on the surface of the structure, and $\sigma$ is Poisson's ratio.

Cyclical alternating stress signals $ES_1$ is produced by connecting signals $E_1$ and $E_2$ to differential amplifier 11 and connecting the output of amplifier 11 to amplifier 13 having an amplification factor of $K_1$.

Similarly, $ES_2$ is produced by amplifying signal $E_2$ by an amplification factor $\sigma$, adding $E_1$ to $\sigma E_2$ through amplifiers 17 and 15 and amplifying the output of amplifier 17 by an amplification factor $K_2$.

The signals $ES_1$ and $ES_2$ at terminals 16 and 18 respectively, are connected to a discriminator 21 which compares signals $ES_1$ and $ES_2$ and whose output is the larger of the absolute values of signals $ES_1$ and $ES_2$.

The absolute value of the cyclical stress signal $ES_1$ or $ES_2$ is always greater than the absolute value of the respective other signal $ES_1$ or $ES_2$. In this embodiment, ES has a maximum value of 10 volts corresponding to maximum cyclical stress.

Figure 2:
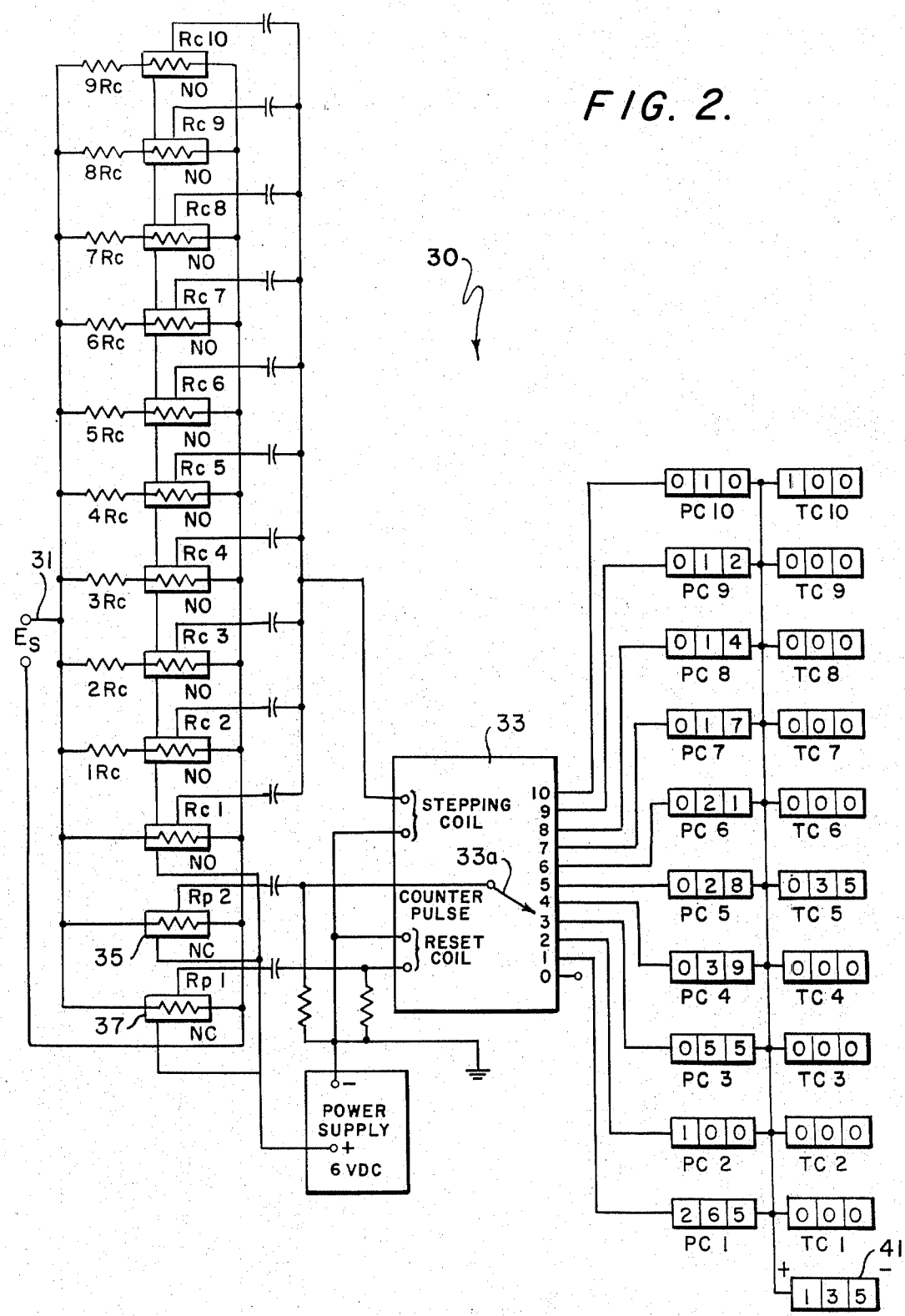
FIG. 2 shows the portion of the device responsive to the larger of the values of $ES_1$ or $ES_2$ and including a voltage divider and relay bank connected to a stepping switch for channeling a counting pulse to an appropriate counter corresponding to the cyclical alternating stress signal amplitude.

Referring now to FIG. 2, the logic system 30 for visually displaying the stress levels represented by the signal output of discriminator 21 is shown. Input terminal 31 is connected to the output of discriminator 21, and connected to a voltage dividing network comprising relays RC1-RC10. In this embodiment, the relays are 1 volt relays, and each 1 volt relay is connected in series to a respective resistance, RC10 connected to 9RC, RC9 connected to 8RC, . . . RC2 connected to 1RC, and RC1 connected directly to terminal 31, with each resistance having a value so the number of relays triggered by an input signal ES will be equal to the highest integral value of the signal ES at terminal 31. This may be explained by the following example. If the maximum signal ES were to be 10 volts, and with smaller signals representing smaller magnitudes of strain, the voltage divider network may be set up so that only RC1 is triggered by a one volt magnitude signal ES, RC1 and RC2 are triggered by a signal magnitude 3 > ES > 2, RC3, RC2, and RC1 are triggered by signal 4 > ES > 3, . . . and all relays, RC10, RC9, RC8, RC7, RC6, RC5, RC4, RC3, RC2, and RC1 are triggered by a signal ES = 10V. The pulses produced by the relays are connected to stepping switch 33 which advances rotary switch 33a to the contact corresponding to the magnitude of the signal ES and in response to the corresponding number of pulses received. As shown in FIG. 2, a signal 5V > ES > 4V will produce a total of four pulses with each relay RC1, RC2, RC3, and RC4 producing a single pulse each and will advance the rotary switch 33a to position 4.

As signal ES decays, corresponding to a decrease in the cyclical strain, 1 volt normally closed (NC) relay 35, opened by the signal pulse ES now closes as signal ES drops back towards 0. At closing, relay 35 sends a pulse through rotary switch 33a and contact 4. As the alternating stress signal ES decays further, NC relay 37, opened by signal ES, now closes sending a reset pulse to the reset coil of stepper switch 33 and resetting rotary switch 33a back to 0 to await the next cyclical stress signal.

Each of the counters PC1 through PC10 are connected to a respective terminal (0-10) of stepping switch 33 and each advances 1 count for each pulse received through its terminal from relay 37. Each counter (PC1-PC10) is preset to produce an output pulse for every $x$ pulses received from stepping switch 33. The output of each counter (PC1-PC10) is connected to a display counter TC1-TC10 respectively, which is incremented for each pulse output of its respective counter PC1-PC10. By picking $x$ to be equal to one one-thousandths of the total allowable stress cycles, the counters (TC1-TC10) will register accumulated cycles of stress per total allowable cycles in thousandths of counts ($F_{10} = n_{10}/N_{10}$; $F_9 = n_9/N_9$; . . . $F_2 = n_2/N_2$; $F_1 = n_1/N_1$). This counting activity occurs at all of the 10 stress levels represented by cyclical stress magnitudes represented by a signal of 1 to 10 volts.

In addition, counter 41 connected in parallel to the outputs of PC1-PC10 is incremented one count for each increment in the count of any one of the counters TC1-TC10. The output of counter 41 is a usage factor $U = (F_1 + F_2 + \ldots F_9 + F_{10})$ equal to the sum of the individual counts in each of the counters (PC1-PC10) and equal to the sum of the individual ratios of accumulated cycles to total allowable cycles, in thousandths of allowable cycles at each stress level and indicates cumulative fatigue damage and remaining fatigue life.

We claim:
1. A system for storing and indicating cumulative fatigue life of a structure comprising:
a structure to be measured for cumulative fatigue;
strain gauge means attached to the structure along the principal stress axes for sensing cyclical strain;
means connected to said strain gauge means and responsive thereto for generating alternating stress signals $ES_1$ and $ES_2$ wherein:

$ES_1 = K_1 [E_{max} - E_{min}]$
$ES_2 = K_2 [E_{max} + \sigma E_{min}]$; and where,
$K_1$ is the modulus of elasticity of the material divided by $2(1+\sigma)$;
$K_2$ is the modulus of elasticity of the material divided by $2(1-\sigma^2)$;
Emax is the strain signal produced in response to strain in the direction of the maximum stress on the structure;
Emin is the strain signal produced in response to strain in the direction of the minimum stress on the structure;
$\sigma$ is the Poisson's ratio; and further including:
means connected to receive said cyclical stress signals, and responsive thereto for indicating the number of stress cycles at discrete levels of strain.

2. The system of claim 1 wherein:
said means for indicating the number of accumulated stress cycles includes means for discriminating between $ES_1$ and $ES_2$ and selecting the larger of $ES_1$ and $ES_2$; and
said means for indicating includes means responsive to said larger signal for storing and indicating the total cumulative stress cycles at each discrete level of stress corresponding to each discrete stress signal generated.

3. The system of claim 2 wherein:
said means for storing and indicating the total cumulative stress cycles at each discrete level includes;
means to generate a plurality of pulses corresponding to the larger of the signals $ES_1$ or $ES_2$;
a first plurality of counters, each counter of said first plurality of counters corresponding to a respective discrete signal stress level;
means responsive to said pulses for connecting said pulse generating means to a respective counter of said first plurality of counters corresponding to the signal stress level $ES_1$ or $ES_2$;
said respective counter being incremented in response to a pulse generated by said pulse generator;
said incrementing pulse being generated in response to said stress signal $ES_1$ or $ES_2$ dropping below a predetermined threshold at the end of each strain cycle.

4. The system of claim 3 wherein:
said counters are each calibrated to generate a single output pulse in response to $x$ pulses received where $x$ is equal to one one-thousandths of the allowable stress cycles at the stress level corresponding to said respective counters.

5. The system of claim 4 including:
a second plurality of counters; wherein:
each said counter of said first plurality of counters connected to said pulse generator responsive to a stress signal $ES_1$ or $ES_2$ has its output connected to a corresponding counter of said second plurality of counters and incrementing said corresponding counter of said second plurality of counters in response to receiving $x$ increments from said pulse generator; and including:
a usage counter;
all said first plurality of counters being connected to said usage counter for indicating the cumulative usage factor;
said counter for indicating cumulative usage factor being incremented for each pulse output for each of said first plurality of counters and indicating the cumulative fatigue damage.

* * * * *